T. C. PARDINGTON & J. G. ASHBY.
PROCESS FOR TREATING GARBAGE.
APPLICATION FILED OCT. 21, 1911.
1,145,845.
Patented July 6, 1915.
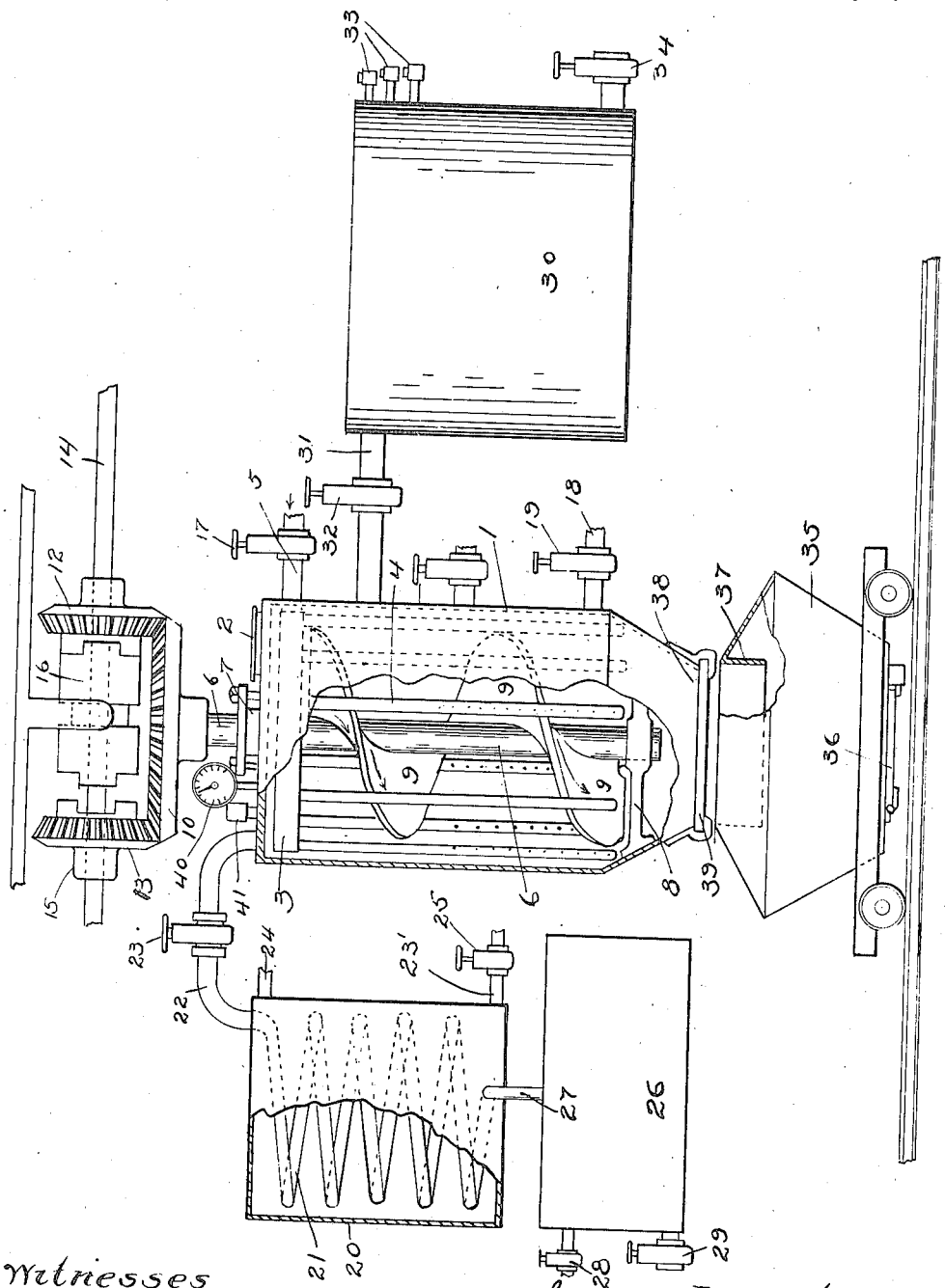

UNITED STATES PATENT OFFICE.

THOMAS C. PARDINGTON, OF CINCINNATI, AND JOHN G. ASHBY, OF MONTGOMERY, OHIO.

PROCESS FOR TREATING GARBAGE.

1,145,845.   Specification of Letters Patent.   Patented July 6, 1915.

Application filed October 21, 1911. Serial No. 656,044.

*To all whom it may concern:*

Be it known that we, THOMAS C. PARDINGTON and JOHN G. ASHBY, both citizens of the United States, and residents, respectively, of Cincinnati, Hamilton county, Ohio, and of Montgomery, Hamilton county, Ohio, have invented certain new and useful Improvements in Processes for Treating Garbage, of which the following is a specification.

Our invention relates to new and useful improvements in the process of treating garbage, and its salient features and advantages consist in subjecting the garbage to high steam pressure in cookers, and while this cooking process is progressing in moving the cooking garbage upward from the bottom, so that none of the garbage can settle, but is so agitated that all the garbage will be subjected to the same action; thus quickly and thoroughly cooking the garbage; further, in carrying the fumes and volatile oils into a condenser and from the condenser allowing said volatile oils to pass into a tank provided for receiving them; further, in forcing the fatty oils to pass into a separate tank provided for that purpose; further, in providing means for taking the noxious smells and odors off from the volatile and fatty oil tanks, and also in providing sanitary cars for removing the garbage away from the cooker, which cars are air-tight thus preventing any foul odor or noxious gases or smells from entering the air.

The advantages and features of the invention will readily become apparent from the following specification.

In the accompanying drawing forming part of this specification the figure is a side elevation of the entire system and apparatus, parts being shown in section to illustrate interior construction.

In carrying out our invention we provide a cooker as 1, shaped as shown and preferably tapered or funnel-like at its lower extremity, a manhole 2 being provided at top of cooker. On the interior of the cooker 1 we provide a ring or annulus 3, having depending therefrom around the cooker, near its wall, a series of pipes 4. The steam pipes 4 are perforated so that they will emit steam which passes into them from the superheated steam inlet pipe 5, through the ring 3, the superheating apparatus not being shown.

Through and into the center of the cooker 1, we pass a shaft 6, journaled in bearings 7 and 8 in the cooker. On this shaft is placed a conveyer 9. The shaft 6 at its upper extremity carries a gear wheel 10, which meshes with gears 12 and 13, respectively, in shafts 14 and 15. Any ordinary clutch mechanism as 16 is used to throw the gears 12 and 13 in or out of mesh with gear 10, so as to turn the conveyer 9 to the right or left, to move the garbage under treatment upward in the cooker 1, or force the cooked garbage down and out of the cooker into the sanitary car for removing the "acted upon" garbage. A valve 17 controls the steam inlet pipe 3. A water pipe 18 controlled by valve 19 enters the cooker 1 at any suitable point.

We provide a condenser 20 having a pipe 21 therein, and connected to the cooker by a pipe 22 controlled by a valve 23. Cold water enters the condenser 20 through the pipe 23′ and passes out through pipe 24 in a heated state as it has come into contact with the pipe 21, which is of course heated by the steam laden with the fumes and volatile oils. The pipes 23 and 24 are controlled by valves as 25. A tank 26 for receiving the volatile oils is connected to the condenser 20 by a suitable pipe 27. The volatile oil tank 26 has a pipe and valve connection 28 through which the oil is drawn off and an exit pipe and valve connection 29 which leads to the sewer for conveying off any remaining gases or fumes.

We provide further, a fatty oil tank 30, into which the fatty oils pass from the cooker 1 through pipe 31 controlled by valve 32. Draw-off valve controlled pipes 33 are provided in the tank 30 to draw off the different grades of oils, and a valve-controlled pipe 34 is present for the purpose of drawing off any refuse or sediment.

For removing the "acted upon" garbage, which is used as a fertilizer, we provide a sanitary car or truck 35, having an exit gate as 36 in the bottom thereof. At the top this car is provided with a mouth having an annular downwardly extending flange 37, which fits the funnel-shaped mouth 38 at extremity of cooker 1. A sliding gate 39 is provided at the bottom of the cooker 1, through which the garbage passes into the car 35. When the car 35 has been filled the gate 39 is placed in its normal position, and a cover or lid (not shown) is forced into the flanged mouth 37 of the car to tightly close it, so there will be no escape of any gases or noxious odors which may be left in the "acted upon" garbage. We also provide a steam pressure gage 40 and safety valve 41. A steam blow-off is also used.

We will now describe the operation of the process and the approved form of apparatus for carrying it into effect.

The cooker 1, of course, is first filled with garbage and tightly closed; superheated steam is now admitted into the cooker through the steam pipe 5, the steam passing into the annulus 3 and into pipes 4, and out through the perforations therein into the garbage, cooking out all the oils and grease, and while this cooking is progressing the conveyer 9, moving in the direction of the arrow, is continuously lifting the garbage from the bottom to top of cooker, thoroughly agitating it and allowing the steam to thoroughly and quickly permeate every particle of the garbage, thus boiling out all the oils, the volatile oils and fumes passing out with the steam into the condenser 20, where, coming into contact with the cold water, the steam is condensed and the volatile oils are precipitated into tank 26 through pipe 27; and the fatty oils pass through pipe 31 into the tank 30; any fumes or noxious gases or smells are passed into the sewer through the exit pipe 29; all these steps of course requiring the opening and closing of the various valves at the proper time.

When the garbage has been sufficiently acted upon, the sanitary car 35 is placed under the mouth of the cooker and the garbage is forced down by reversing the motion of shaft 6, so that the conveyer 9 will revolve in a direction opposite to that shown by the arrow, and thus convey the garbage out of the cooker into the car; and from this point it may be removed to any point. At any time it may be desired to float the fatty oils in the cooker or clean it, water may be forced into the cooker through the pipe 18.

That part of the process which forces the garbage up against the superheated steam is not a mere agitation, but a result is obtained by which the garbage and steam are intermingled, the garbage being divided into particles, thus rendering the action of the steam more efficient, a greater amount of oils and fatty matter being extracted from the garbage in a more limited amount of time.

It will readily become apparent that our process is odorless from start to finish.

Of course, we wish to be understood as not limiting ourselves to the exact and specific construction herein shown for carrying out our process, but it may be modified; and may be made of any size, shape or contour.

What we claim as new and our invention, and desire to secure by Letters Patent is:

1. The process of treating garbage, consisting in subjecting the garbage to the action of highly heated steam in a closed tank, while the garbage is forced to travel upward within the tank, condensing the fumes in a condenser, and separately drawing off the volatile and fatty oils, then forcing the "acted upon" garbage into a vessel from the bottom of the cooker, said vessel capable of being closed air tight.

2. The process of treating garbage, consisting in subjecting the garbage to the action of highly heated steam in a closed cooker and agitating same by screw power and forcing the garbage to travel upward within the tank, condensing the fumes in a condenser, and separately drawing off the volatile and fatty oils, then forcing the acted upon garbage into a vessel from the bottom of the cooker, said vessel capable of being closed air tight to prevent noxious smells.

3. The process of treating garbage, consisting in subjecting the garbage to the action of highly heated steam in a closed tank at the top and throughout the extent of the tank, while the garbage is being stirred and lifted upward by revolving means in the tank, condensing the fumes in a condenser, and separately drawing off the volatile and fatty oils.

4. The process of treating garbage, consisting in subjecting the garbage to the action of highly heated steam in a closed tank, more directly at the top and throughout the sides of the tank while the garbage is being stirred and lifted upward by revolving means in the tank, condensing the fumes, separating and drawing off the volatile and fatty oils, then forcing the "acted upon" garbage into a vessel from the bottom of the tank, said vessel capable of being closed air-tight.

THOMAS C. PARDINGTON.
JOHN G. ASHBY.

Witnesses:
 THOMAS H. STAYLON,
 H. E. CARSTENS.